United States Patent
Saxena et al.

(10) Patent No.: US 11,108,287 B2
(45) Date of Patent: Aug. 31, 2021

(54) SPHERICAL ELECTROMAGNETIC MACHINE WITH TWO DEGREES OF UNCONSTRAINED ROTATIONAL FREEDOM

(71) Applicant: HONEYWELL INTERNATIONAL INC., Morris Plains, NJ (US)

(72) Inventors: Sunit Kumar Saxena, Bangalore (IN); Pandu Ranga Rao Somarowthu, Bangalore (IN); Deepak Bhimrao Mahajan, Bangalore (IN); Abhijit Kulkarni, Bangalore (IN); Raghuveer Hanumanthrao Desai, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 80 days.

(21) Appl. No.: 16/504,111

(22) Filed: Jul. 5, 2019

(65) Prior Publication Data
US 2021/0006107 A1 Jan. 7, 2021

(51) Int. Cl.
*H02K 1/26* (2006.01)
*H02K 5/15* (2006.01)
(Continued)

(52) U.S. Cl.
CPC .............. *H02K 1/265* (2013.01); *H02K 5/15* (2013.01); *H02K 41/0354* (2013.01); *H02K 5/167* (2013.01)

(58) Field of Classification Search
CPC ............. H02K 1/12; H02K 5/15; H02K 1/274
(Continued)

(56) References Cited

U.S. PATENT DOCUMENTS

| 2,731,836 A | * | 1/1956 | Wendt | .................... | G01C 19/38 74/5.7 |
| 2,880,616 A | * | 4/1959 | Aumuller | ............... | G01C 19/38 74/5.7 |

(Continued)

FOREIGN PATENT DOCUMENTS

| CN | 101505076 A | * | 8/2009 |
| CN | 108448867 A | | 8/2018 |

(Continued)

OTHER PUBLICATIONS

Wu T L, Chen J H, Chang S H et al (2008) A Six-DOF Prismatic-Spherical-Spherical Parallel Compliant Nanopositioner. IEEE Transactions on Ultrasonics, Ferroelectrics, and Frequency Control, vol. 55, No. 12:2544-2551, Dec. 2008.

(Continued)

*Primary Examiner* — Jose A Gonzalez Quinones
(74) *Attorney, Agent, or Firm* — Lorenz & Kopf, LLP

(57) ABSTRACT

A spherical electromagnetic machine includes a spherical stator, a plurality of longitudinal slots, a plurality of latitudinal slots, a plurality of longitudinal coils, a plurality of latitudinal coils, a first hemispherical shell rotor, and a second hemispherical shell rotor. The longitudinal slots and latitudinal slots are formed in, and are spaced evenly around, the outer surface. The longitudinal coils are disposed within a different one of the longitudinal slots. The latitudinal coils are disposed within a different one of the latitudinal slots. The first and second hemispherical shell rotors are mounted for rotation relative to the spherical stator body and have magnets on their inner surfaces. A Lorentz force causes movement of the first and second hemispherical shell rotors when electrical current is supplied to one or more of the longitudinal coils or to one or more of the latitudinal coils.

20 Claims, 13 Drawing Sheets

(51) Int. Cl.
*H02K 5/167* (2006.01)
*H02K 41/035* (2006.01)

(58) Field of Classification Search
USPC .................. 310/38, 156.43, 179, 323.06
See application file for complete search history.

(56) References Cited

U.S. PATENT DOCUMENTS

| | | | |
|---|---|---|---|
| 4,908,558 | A | 3/1990 | Lordo et al. |
| 9,000,628 | B1 | 4/2015 | Ho |
| 9,893,574 | B2 | 2/2018 | Bandera |
| 2017/0012482 | A1 | 1/2017 | Bandera |
| 2020/0021149 | A1* | 1/2020 | Dai .................. H02K 1/12 |

FOREIGN PATENT DOCUMENTS

| | | | |
|---|---|---|---|
| EP | 1135781 | B1 | 3/2006 |
| JP | 2004023907 | A | 1/2004 |

OTHER PUBLICATIONS

Lee, Kok-Meng, et al., "A Three-Degrees-of-Freedom Micromotion In-Parallel Actuated Manipulator," IEEE Transactions on Robotics and Automation, vol. 7, No. 5, Oct. 1991.

Paganelli D (2007) Avoiding Parallel Singularities of 3UPS and 3UPU Spherical Wrists. Proceedings of 2007 IEEE International Conference on Robotics and Automation, 1201-1206, Rome, Italy, Apr. 10-14, 2007.

Lee K M, Son H, Joni J et al (2005) Concept Development and Design of a Spherical Wheel Motor (SWM). Proceedings of the 2005 IEEE International Conference on Robotics and Automation, 3652-3657, Barcelona, Spain, Apr. 2005.

Chung B G, Yi B J, Suh I H, Kim W K, Chung W K et al (2001) Design and Analysis of a Spatial 3-DOF Micromanipulator for Tele-operation. Proceedings of 2001 IEEE/RSJ International Conference on Intelligent Robots and Systems, 1201-1206, Maui, Hawaii, USA, Oct. 29-Nov. 3, 2001.

Lee, Kok-Meng, et al., "Design Concept Development of a Spherical Stepper for Robotic Applications," IEEE Transactions on Robotics and Automation, vol. 7, No. 1, Feb. 1991.

Lee, Kok-Meng, et al., "Design Method for Prototyping a Cost-Effective VR Spherical Motor," Proceedings of the 2004 IEEE Conference on Robotics, Automation and Mechatronics, Dec. 2004.

Lee K M, Roth R B, Zhou Z et al (1996) Dynamic modeling and control of a ball-joint-like variable-reluctance spherical motor. ASME Journal of Dynamic Systems, Measurement, and Control, vol. 118:29-40, Mar. 1996.

Lee K M, Sosseh R A et al (2000) Effects of Fixture Dynamics on Back-stepping Control of a VR Spherical Motor. Proceedings of the 7th International Conference on Robotics, Automation and Computer Vision, vol. 1:384-389, Singapore, Dec. 2-5, 2000.

Lee K M, Sosseh R A et al (2002) Effects of the Torque Model on the Control of a VR Spherical Motor. Proceedings of the 2nd IFAC Conference on Mechatronic Systems, Berkeley, California, USA, Dec. 9-11, 2002.

Lee K M, Arjunan S et al (1988) Force/torque sensing and micro-motion manipulation of a spherical stepping wrist motor. Proceedings of the 1988 Joint American Control Conference (ACC), vol. 1:950-955, Jun. 15-17, 1988.

Yan, Liang, et al., "Design, Modeling and Experiments of 3-DOF Electromagnetic Spherical Actuators," Mechanisms and Machine Science 4, 2011.

Kurtz R, Hayward V et al (1992) Multiple-Goal Kinematic Optimization of a Parallel Spherical Mechanism with Actuator Redundancy. IEEE Transactions on Robotics and Automation, vol. 8, No. 5:644-651, Oct. 1992.

Lee K M, Wei Z Y, Joni J et al (2004) Parametric Study on Pole Geometry and Thermal Effects of a VRSM. Proceedings of the 2004 IEEE Conference on Robotics, Automation and Mechatronics, 548-553, Singapore, Dec. 1-3, 2004.

Cho C, Kang D, Kim S, Won S, Lee J et al (2008) Using Mathematical Method of Torque Simulation for Reducing Calculation Time of Permanent Magnet Spherical Wheel Motor. Proceedings of the International Conference on Electrical Machines and Systems, 3112-3115, Wuhan, China, Oct. 2008.

\* cited by examiner

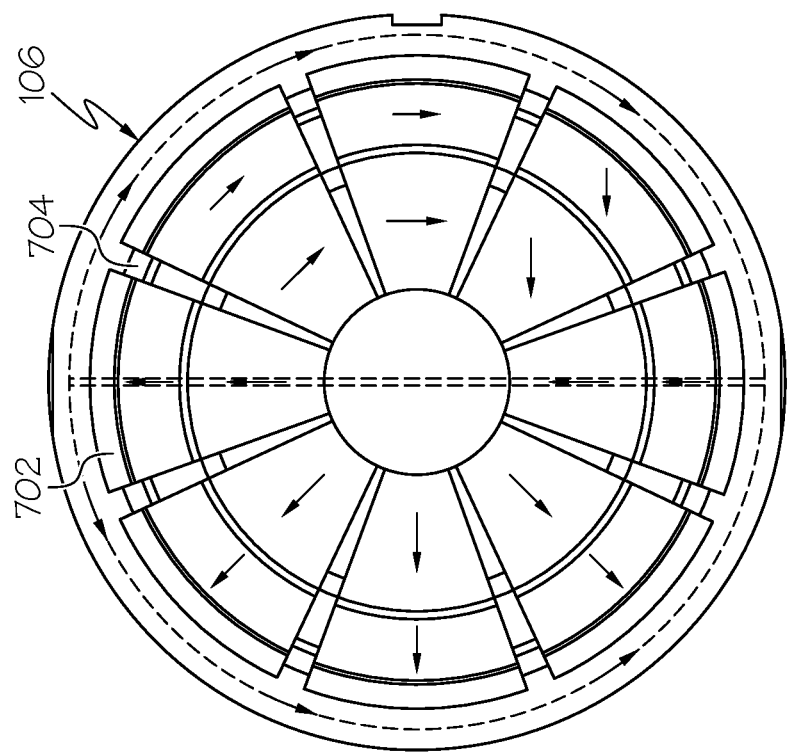
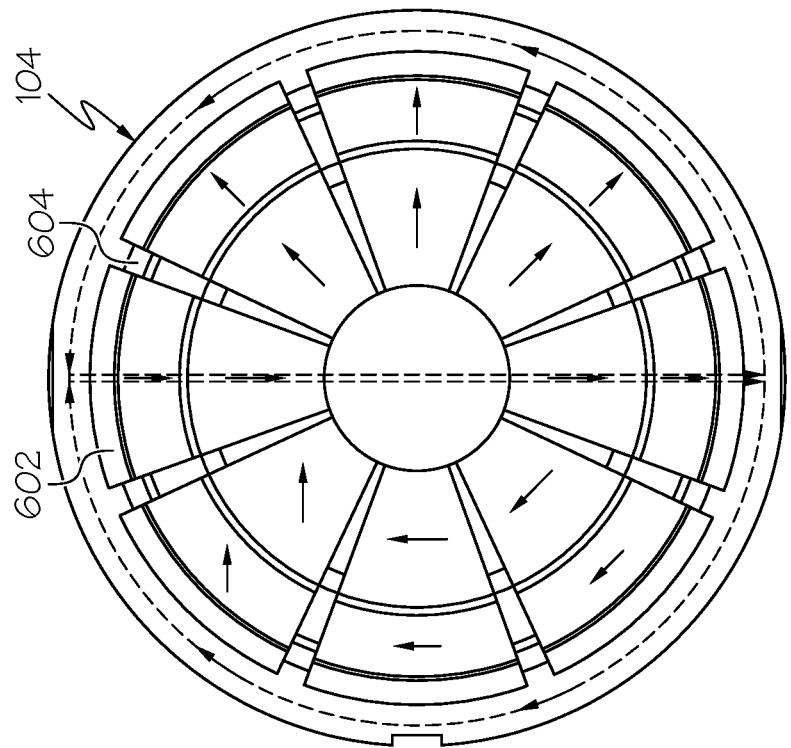

SPHERICAL ELECTROMAGNETIC MACHINE WITH TWO DEGREES OF UNCONSTRAINED ROTATIONAL FREEDOM

TECHNICAL FIELD

The present invention generally relates to electromagnetic machines, and more particularly relates to a spherical electromagnetic machine with two degrees of unconstrained rotational freedom.

BACKGROUND

It is generally known that currently available motion control systems that are designed to move an object in more than one degree of freedom (DoF) include a separate motor or actuator for each DoF. More specifically, at least two motors or actuators are needed to implement 2-DoF motion, at least three motors or actuators are needed to implement 3-DoF motion, and so on. Consequently, mechanisms that involve more than one DoF tend to be somewhat large and cumbersome, and therefore inefficient.

Various attempts have been made to develop electromagnetic machines (e.g., motors) that can rotate in multiple degrees-of-freedom. For example, various spherical motor configurations have been developed. However, the spherical motors heretofore developed suffer certain drawbacks. For example, the spherical motors presently known have drawbacks such as relatively low torque capability for a given volume and weight, limited angular movement in at least one axis of rotation etc. As such, these spherical motors cannot be implemented in systems that demand relatively high output torque. Moreover, in most instances, the coils are physically difficult to wind onto the spherical stator body. This adds to the overall cost and size.

Hence, there is a need for a spherical electromagnetic machine that can deliver relatively higher torque with reduced torque ripple for many industrial applications and/or allows for relatively less difficulty in winding the coils thereon. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a spherical electromagnetic machine includes a spherical stator, a plurality of longitudinal slots, a plurality of latitudinal slots, a plurality of longitudinal coils, a plurality of latitudinal coils, a first hemispherical shell rotor, a first plurality of magnets, a second hemispherical shell rotor, and a second plurality of magnets. The spherical stator body has an outer surface. The longitudinal slots are formed in, and are spaced evenly around, the outer surface. The latitudinal slots are formed in, and are spaced evenly around, the outer surface. The longitudinal coils are wound around the spherical stator body, and each longitudinal coil has a portion thereof disposed within a different one of the longitudinal slots. The latitudinal coils are wound around the spherical stator body, and each latitudinal coil has a portion thereof disposed within a different one of the latitudinal slots. The first hemispherical shell rotor is mounted for rotation relative to the spherical stator body and is spaced apart therefrom. The first hemispherical shell rotor surrounds a portion of a first half of the spherical stator body. The first plurality of magnets are coupled to an inner surface of the first hemispherical shell rotor and face the spherical stator body. The second hemispherical shell rotor is mounted for rotation relative to the spherical stator body and is spaced apart therefrom. The second hemispherical shell rotor surrounds a portion of a second half of the spherical stator body. The second plurality of magnets are coupled to an inner surface of the second hemispherical shell rotor and face the spherical stator body. A Lorentz force causes movement of the first and second hemispherical shell rotors when electrical current is supplied to one or more of the plurality of longitudinal coils or to one or more of the plurality of latitudinal coils.

In another embodiment, a spherical electromagnetic machine includes spherical stator body having an outer surface, a predetermined number of longitudinal slots ($N_{longitude}$), a predetermined number of latitudinal slots ($N_{latitude}$), a plurality of longitudinal coils, a plurality of latitudinal coils, a first hemispherical shell rotor, a first plurality of magnets, a second hemispherical shell rotor, a second plurality of magnets, and a gimbal. The longitudinal slots are formed in, and are spaced evenly around, the outer surface. The latitudinal slots are formed in, and are spaced evenly around, the outer surface. The longitudinal coils are wound around the spherical stator body, and each longitudinal coil has a portion thereof disposed within a different one of the longitudinal slots. The latitudinal coils are wound around the spherical stator body, and each latitudinal coil has a portion thereof disposed within a different one of the latitudinal slots. The first hemispherical shell rotor is mounted for rotation relative to the spherical stator body and is spaced apart therefrom. The first hemispherical shell rotor surrounds a portion of a first half of the spherical stator body. The first plurality of magnets are coupled to an inner surface of the first hemispherical shell rotor and face the spherical stator body. The second hemispherical shell rotor is mounted for rotation relative to the spherical stator body and is spaced apart therefrom. The second hemispherical shell rotor surrounds a portion of a second half of the spherical stator body. The second plurality of magnets are coupled to an inner surface of the second hemispherical shell rotor and face the spherical stator body. The gimbal is coupled to the spherical body, the first hemispherical shell rotor, and the second hemispherical shell rotor. The spherical stator body, the plurality of longitudinal coils, and the plurality of latitudinal coils implement a stator having a predetermined number of poles (P). The longitudinal slots are separated from each other by a longitudinal slot pitch angle defined (in radians) as $$\frac{\pi * P}{2 * N_{longitude}},$$

and the latitudinal slots are separated from each other by a latitudinal slot pitch angle defined (in radians) as $$\frac{\pi * P}{2 * N_{latitude}}.$$

In yet another embodiment, a spherical electromagnetic machine includes a spherical stator body having an outer surface, twenty-four longitudinal slots, sixteen latitudinal slots, a plurality of longitudinal coils, a plurality of latitudinal coils, a first hemispherical shell rotor, a first plurality of magnets, a second hemispherical shell rotor, a second plurality of magnets, and a gimbal. The longitudinal slots are formed in, and are spaced evenly around, the outer surface. The latitudinal slots are formed in, and are spaced evenly around, the outer surface. The longitudinal coils are wound around the spherical stator body, and each longitudinal coil has a portion thereof disposed within a different one of the longitudinal slots. The latitudinal coils are wound around the spherical stator body, and each latitudinal coil has a portion thereof disposed within a different one of the latitudinal slots. The first hemispherical shell rotor is mounted for rotation relative to the spherical stator body and is spaced apart therefrom. The first hemispherical shell rotor surrounds a portion of a first half of the spherical stator body. The first plurality of magnets are coupled to an inner surface of the first hemispherical shell rotor and face the spherical stator body. The second hemispherical shell rotor is mounted for rotation relative to the spherical stator body and is spaced apart therefrom. The second hemispherical shell rotor surrounds a portion of a second half of the spherical stator body. The second plurality of magnets are coupled to an inner surface of the second hemispherical shell rotor and face the spherical stator body. The gimbal is coupled to the spherical body, the first hemispherical shell rotor, and the second hemispherical shell rotor. The spherical stator body, the plurality of longitudinal coils, and the plurality of latitudinal coils implement a 4-pole stator. The longitudinal slots are separated from each other by a longitudinal slot pitch angle of 15-degrees $$\left(\frac{\pi}{12} \text{ rad}\right),$$

and the latitudinal slots are separated from each other by a latitudinal slot pitch angle of 22.5-degree $$\left(\frac{\pi}{8} \text{ rad}\right).$$

A Lorentz force causes movement of the first and second hemispherical shell rotors when electrical current is supplied to one or more of the longitudinal coils or to one or more of the plurality of latitudinal coils.

Furthermore, other desirable features and characteristics of the spherical electromagnetic machine will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIGS. 9A and 9B depict an end views of first and second hemispherical shell rotors, respectively, illustrating how first and second pluralities of magnets, in another embodiment, may be coupled to an inner surface thereof;

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
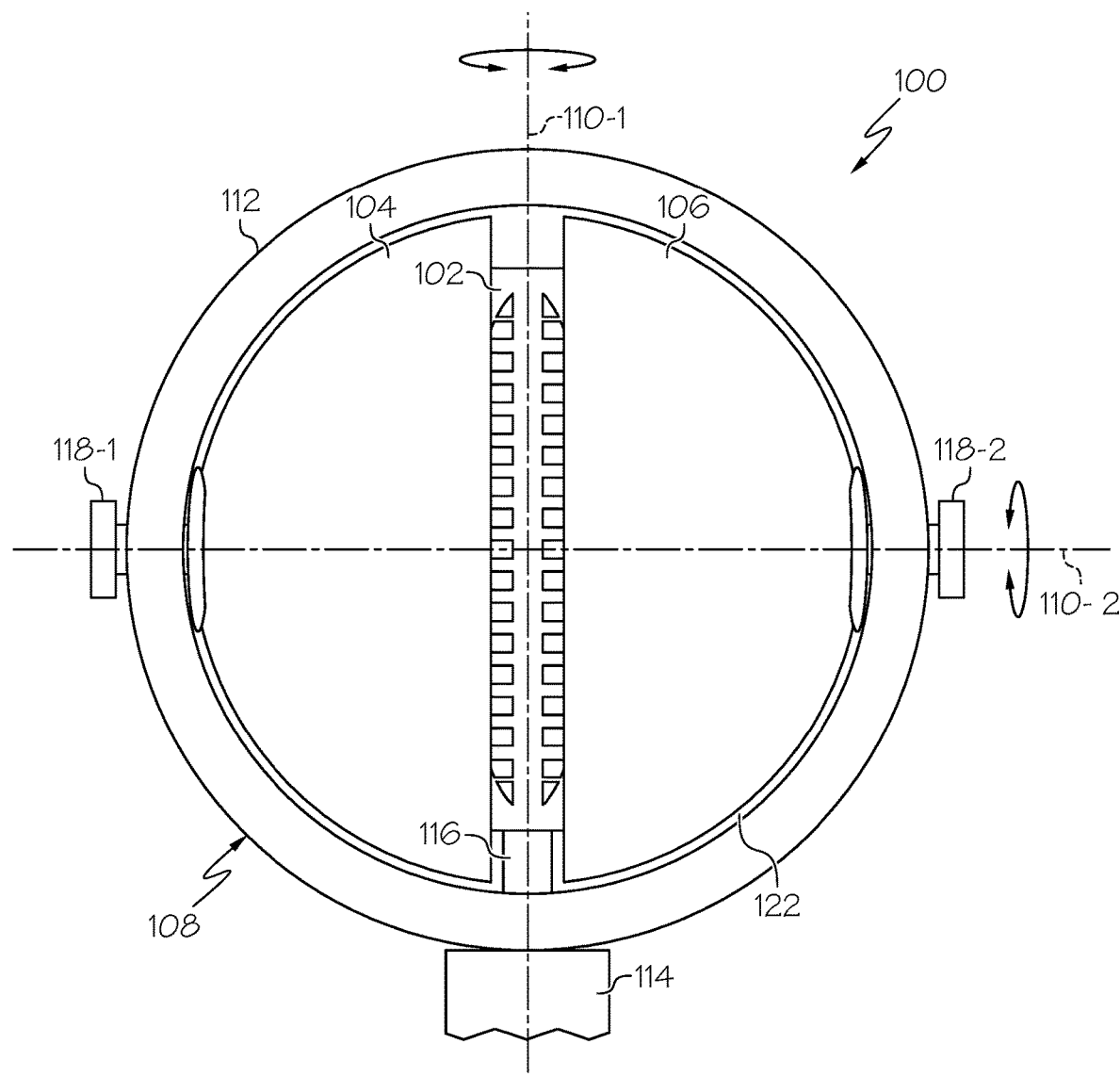
FIG. 1 depicts a front view of one embodiment of an electromagnetic machine.

Referring first to FIG. 1, one embodiment of a spherical electromagnetic machine 100 is depicted. The depicted machine 100 includes a spherical stator body 102, a first hemispherical shell rotor 104, and a second hemispherical shell rotor 106. A gimbal assembly 108 is coupled to the spherical stator body 102, the first hemispherical shell rotor 104, and the second hemispherical shell rotor 106 such that the machine 100 implements two degree-of-freedom, 360-degree rotation about two perpendicular rotational axes 110—a first rotational axis 110-1 and about a second rotational axis 110-2. In particular, as FIG. 1 depicts, the gimbal assembly 108 includes a gimbal 112, a stator base holder 114, a mount shaft 116, and two rotor bearings 118—a first rotor bearing 118-1 and a second rotor bearing 118-2.

The gimbal base holder 114 is used to fixedly mount the machine 100 to a non-illustrated structure. The stator mount shaft 116 is coupled to the stator mount structure 114 and to the spherical stator body 102. The stator mount shaft 116 fixedly mounts the spherical stator body 102 against rotation. However, the stator mount shaft 116 and the gimbal 112 are configured, via a non-visible bearing assembly, such that the gimbal 112 is rotatable, about the first rotational axis 110-1, relative to the stator mount shaft 116 and concomitantly the spherical stator body 102.

The first and second rotor bearings 118-1, 118-2 are coupled to the first and second hemispherical shell rotors 104, 106, respectively, and to the gimbal 112. As such, the first and second hemispherical shell rotors 104, 106 are rotatable, relative to both the spherical stator body 102 and the gimbal 112, about the second rotational axis 110-2. The hemispherical shell rotors 104, 106 are also rotatable about the rotational axis 110-1 along with the gimbal 112.

Figure 2:
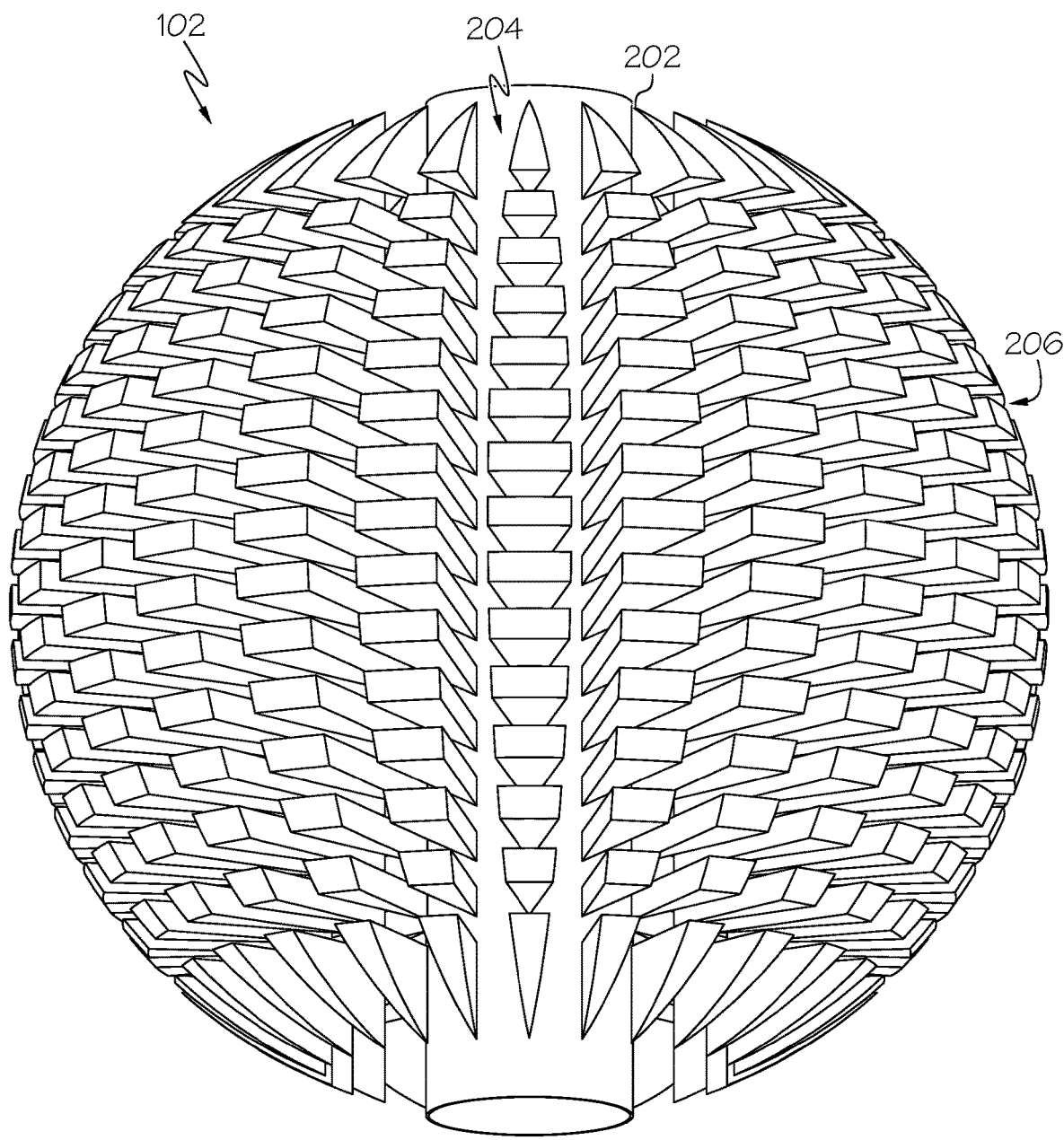
FIGS. 2 and 3 depict perspective and top views, respectively, of one embodiment of a spherical stator body that may be used in the machine of FIG. 1.
Figure 3:
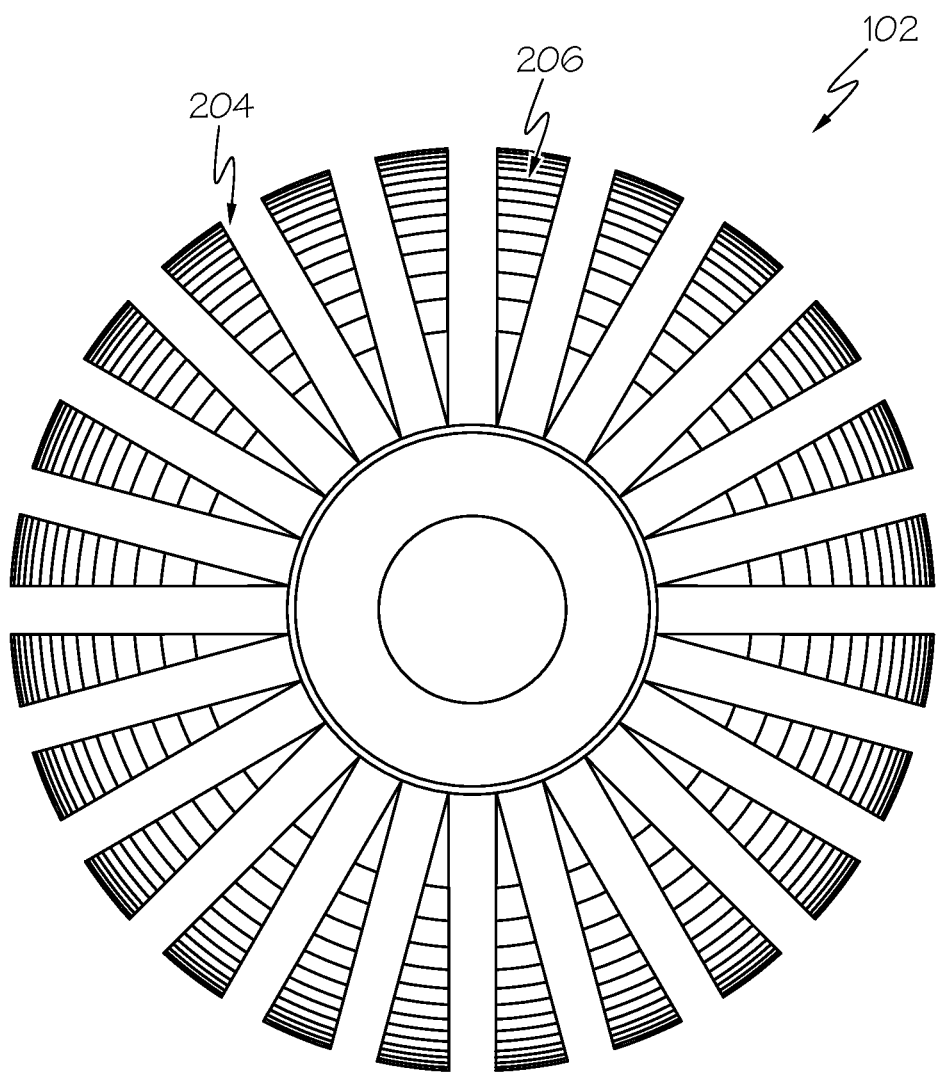

The spherical stator body 102, an embodiment of which is shown more clearly in FIGS. 2 and 3, has an outer surface 202 that has a plurality of slots formed therein. In particular, a plurality of longitudinal slots 204 are formed in, and are spaced evenly around, the outer surface 202, and a plurality of latitudinal slots 206 are formed in, and are spaced evenly around, the outer surface 202. It will be appreciated that the number of longitudinal slots ($N_{longitude}$) 204 and the number of latitudinal slots ($N_{latitude}$) 206 that are formed in the outer surface 202 may vary. In the depicted embodiment, however, the predetermined number of longitudinal slots ($N_{longitude}$) is 24, and the predetermined number of latitudinal slots ($N_{latitude}$) is 16. It will additionally be appreciated that the spherical stator body 102 may be formed of any one of numerous known materials, but in a particular preferred embodiment it comprises a ferromagnetic material, such as iron, (e.g., silicon iron, cobalt iron), low carbon steel, magnetic stainless steel, and nickel alloys, just to name a few.

A plurality of longitudinal coils (not depicted in FIGS. 2 and 3) are wound around the spherical stator body 102, such that a portion of each is disposed within a different one of the longitudinal slots 204. In addition, a plurality of latitudinal coils (also not depicted in FIGS. 2 and 3) are wound around the spherical stator body 102, such that a portion of each is disposed within a different one of the latitudinal slots 206. Together, the spherical stator body 102, the longitudinal coils, and the latitudinal coils implement a stator having a predetermined number of poles (P). In one example embodiment, which is described in more detail herein, the spherical stator body 102, the longitudinal coils, and the latitudinal coils implement a 4-pole stator (e.g., P=4). It will be appreciated, however, that the spherical stator body 102, the longitudinal coils, and the latitudinal coils could implement a stator having more or less than this number of poles.

Regardless of the number of poles (P), it was previously noted that the longitudinal slots 204 and the latitudinal slots 206 are spaced evenly around the outer surface 202. In one particular embodiment, the the longitudinal slots 204 are separated from each other by a longitudinal slot pitch angle and the latitudinal slots 206 are separated from each other by a latitudinal slot pitch angle. The longitudinal slot pitch angle (in radians) is defined as $$\frac{\pi * P}{2 * N_{longitude}},$$

and the latitudinal slot pitch angle (in radians) is defined as $$\frac{\pi * P}{2 * N_{latitude}}.$$

Thus, in an embodiment in which the spherical stator body 102, the longitudinal coils, and the latitudinal coils implement a 4-pole stator, and in which the number of longitudinal slots 204 is 24 and the number of latitudinal slots 206 is 16, it will be appreciated that the longitudinal slots 204 are separated from each other by a longitudinal slot pitch angle of 15-degrees $$(\frac{\pi}{12} \text{ rad}),$$

and the latitudinal slots 206 are separated from each other by a latitudinal slot pitch angle of 22.5-degrees $$(\frac{\pi}{8} \text{ rad}).$$

Just as the number of longitudinal slots 204, the number of latitudinal slots 206, and the number of poles (P) may vary, so too may the number of longitudinal coils and the number of latitudinal coils. More specifically, the plurality of longitudinal coils may include a predetermined number of different longitudinal phase coils ($N_{long\_phase}$), and the plurality of latitudinal coils may include a predetermined number of different latitudinal phase coils ($N_{lat\_phase}$). In one particular embodiment, the electromagnetic machine 100 includes two different longitudinal phase coils, which are spaced 90 electrical degrees $$(\text{e.g.}, \frac{\pi}{2} \text{ rad})$$

apart, and two different latitudinal phase coils, which are also spaced 90 electrical degrees $$(\text{e.g.}, \frac{\pi}{2} \text{ rad})$$

apart. That is, $N_{long\_phase} = N_{lat\_phase}$. It will be appreciated that in other embodiments, $N_{long\_phase}$ may not be equal to $N_{lat\_phase}$, and the individual number of phase coils may be more or less than two.

Figure 4:
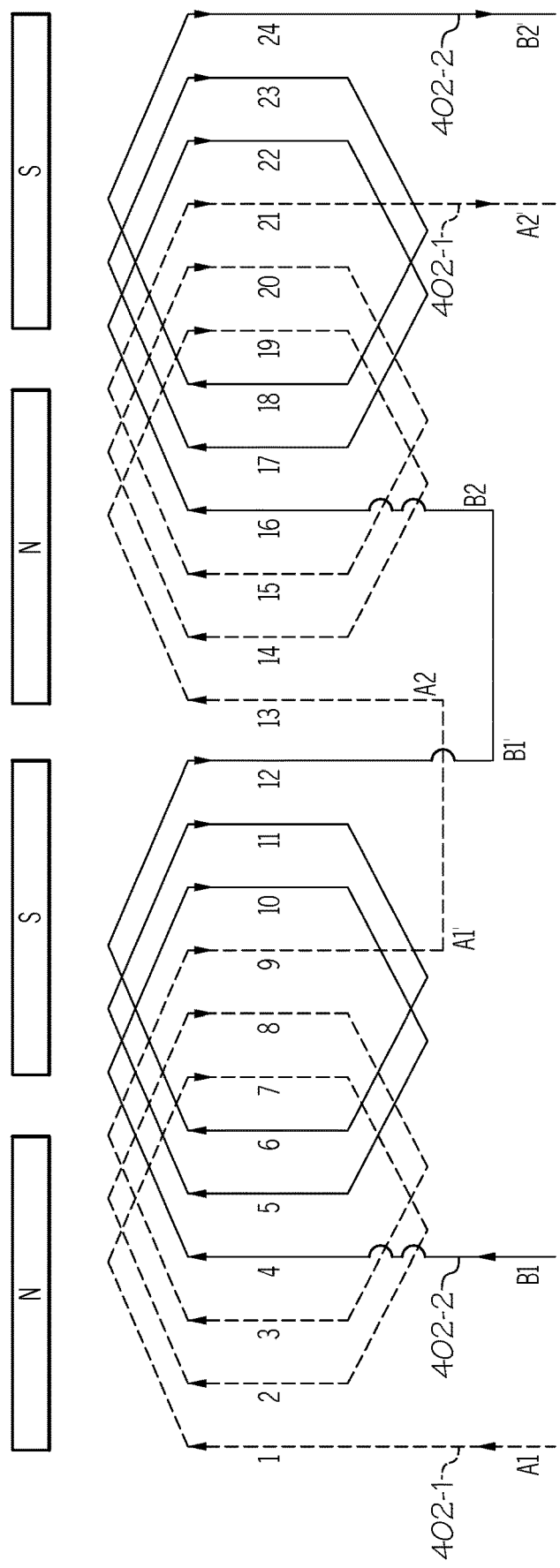
FIG. 4 depicts a two-dimensional winding diagram showing how two longitudinal phase coils may be wound on the spherical stator body of FIGS. 2 and 3.
Figure 5:
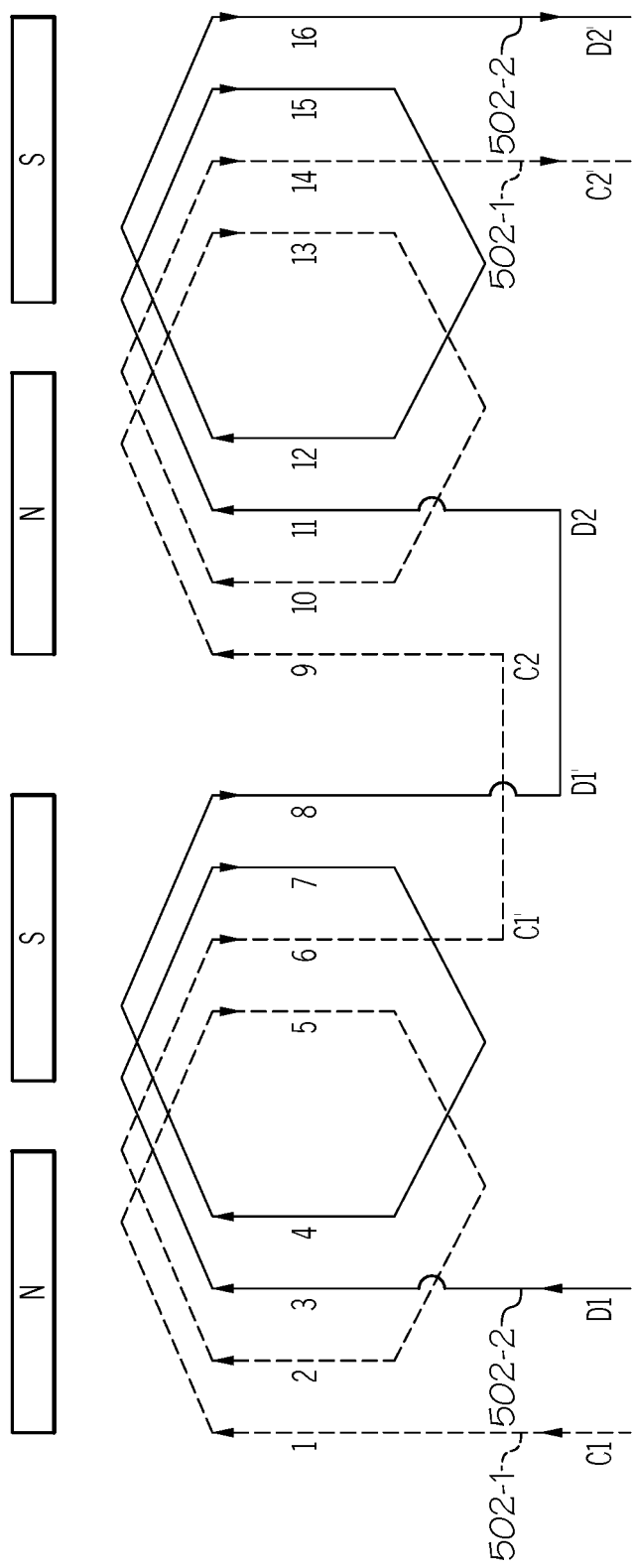
FIG. 5 depicts a two-dimensional winding diagram showing how two latitudinal phase coils may be wound on the spherical stator body of FIGS. 2 and 3.
Figure 6B:
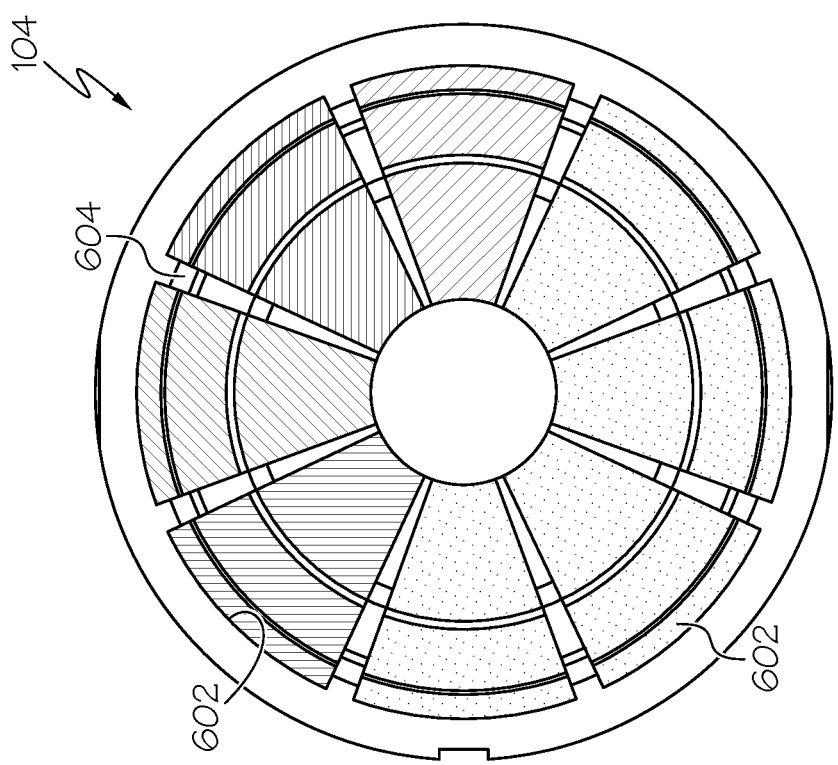
FIGS. 6A and 6B depict plan and end views, respectively, of a first hemispherical shell rotor, illustrating how a first plurality of magnets, in one embodiment, may be coupled to an inner surface thereof.
Figure 6A:
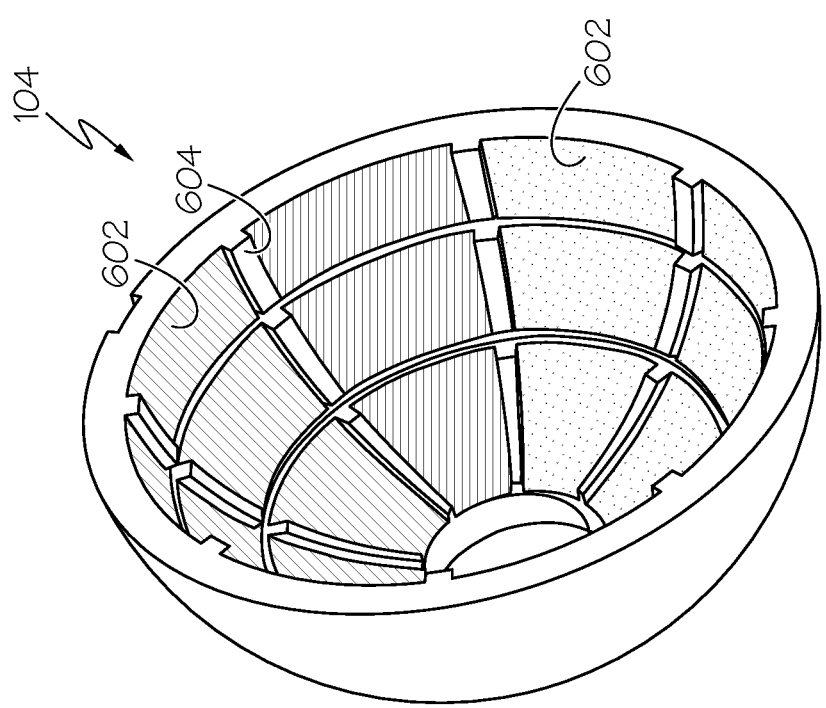
Figure 7B:
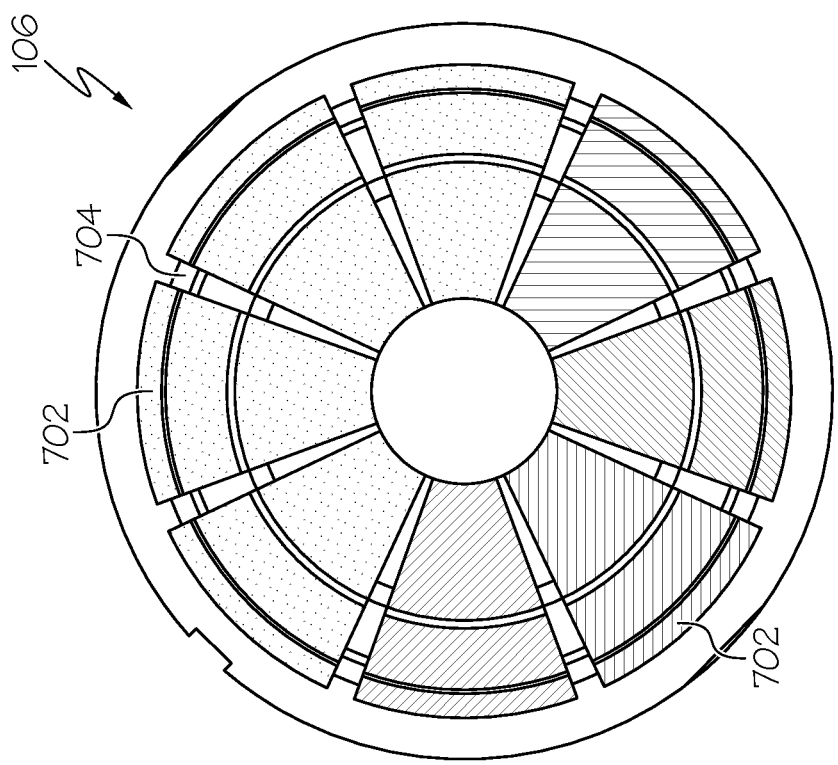
FIGS. 7A and 7B depict plan and end views of a second hemispherical shell rotor, illustrating how a second plurality of magnets, in one embodiment, may be coupled to an inner surface thereof.
Figure 7A:
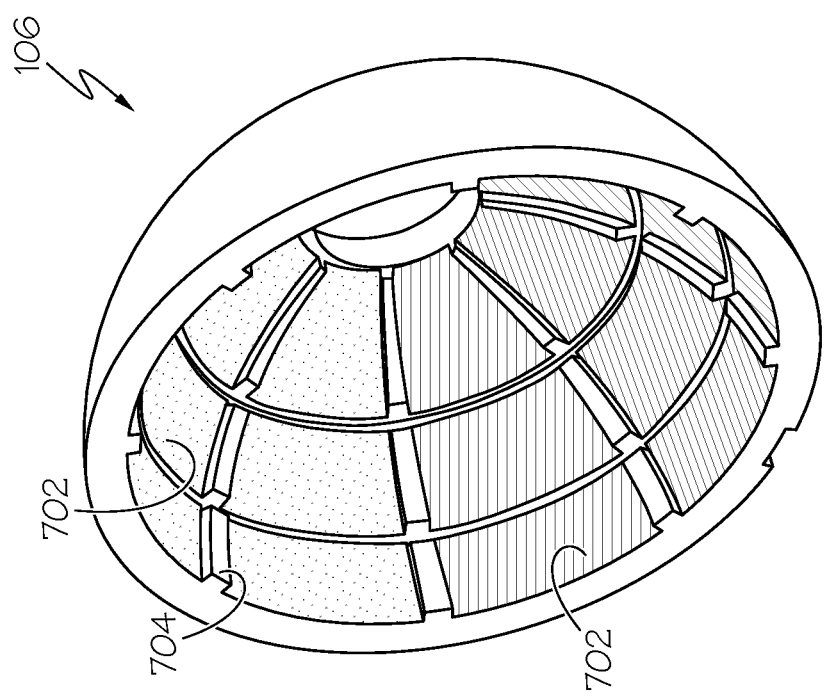
Figure 8B:
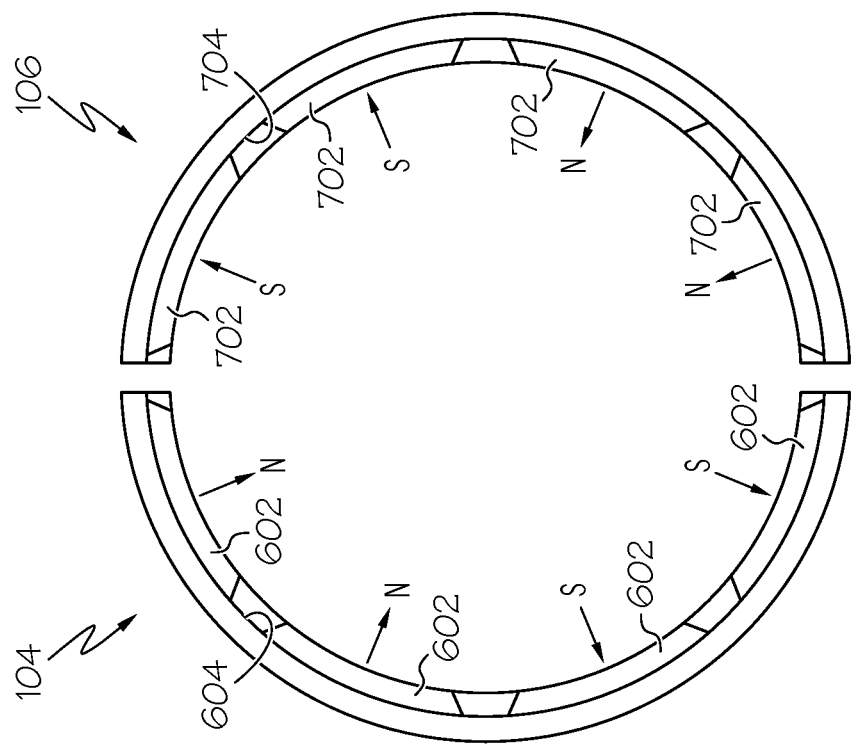
FIGS. 8A and 8B depict plan and end cross section views of first and second hemispherical shell rotors, illustrating how first and second pluralities of magnets may be coupled to an inner surface thereof.
Figure 8A:
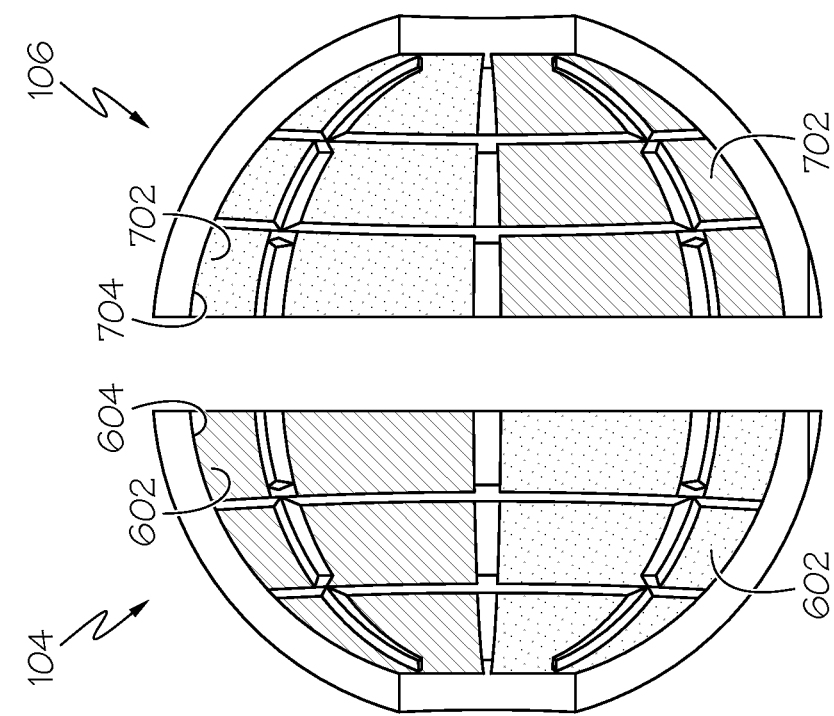
Figure 10C:
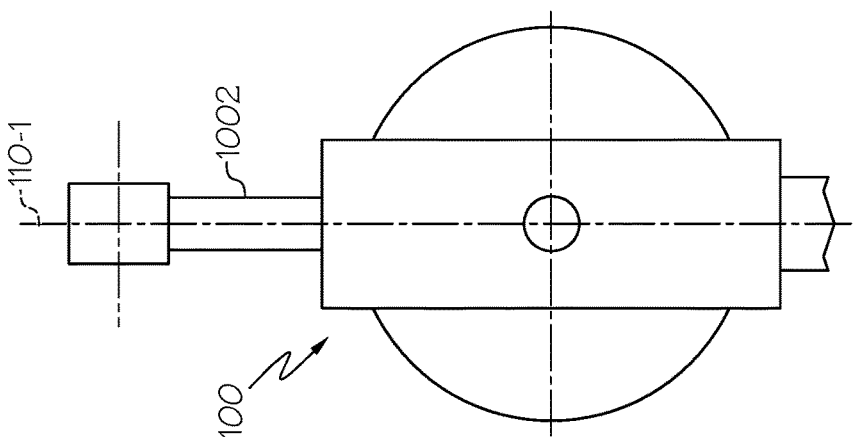
FIGS. 10A-10E depict rotation of portions of the electromagnetic machine about a single rotational axis.
Figure 10B:
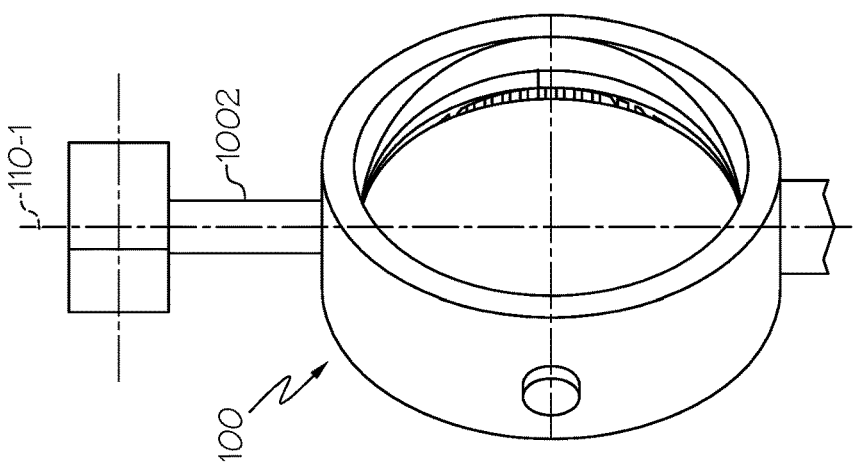
Figure 10A:
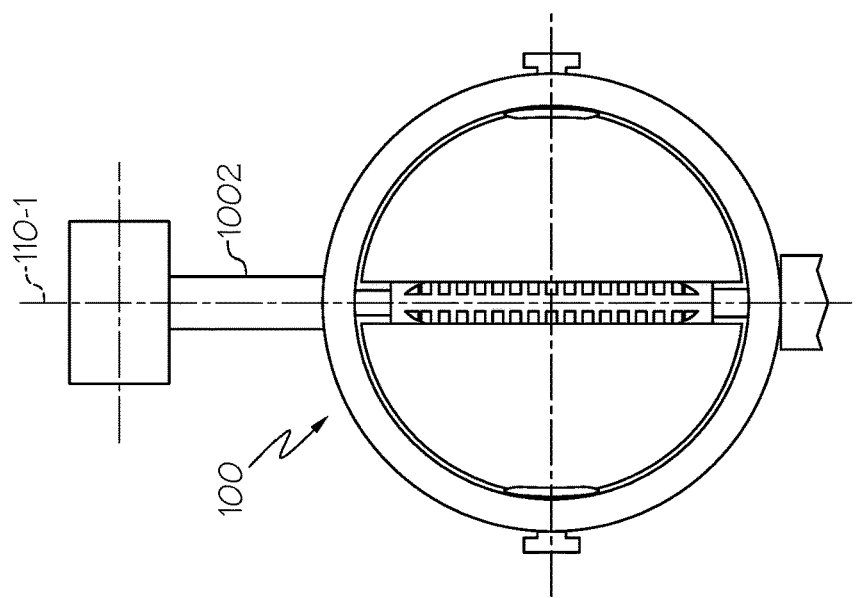
Figure 10E:
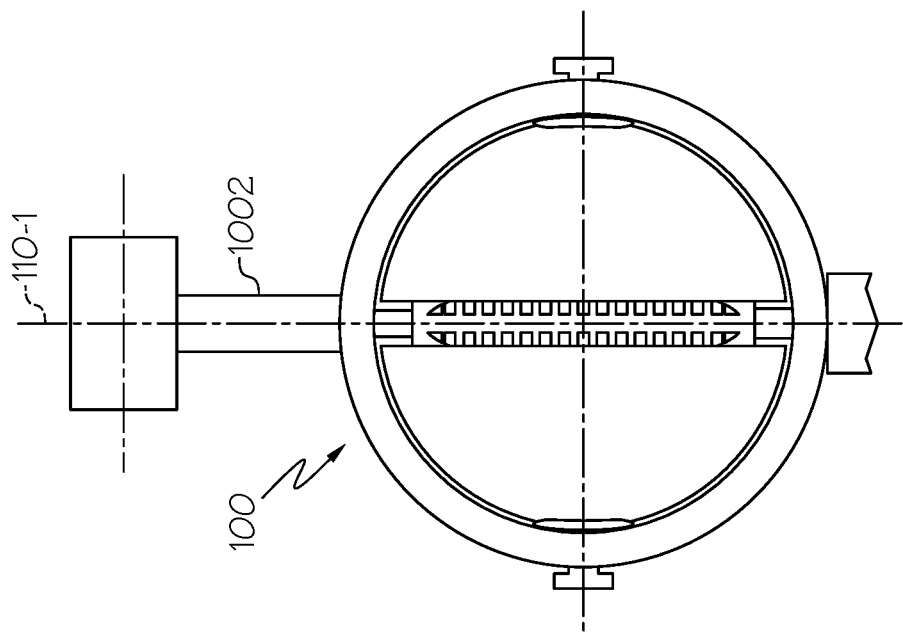
Figure 10D:
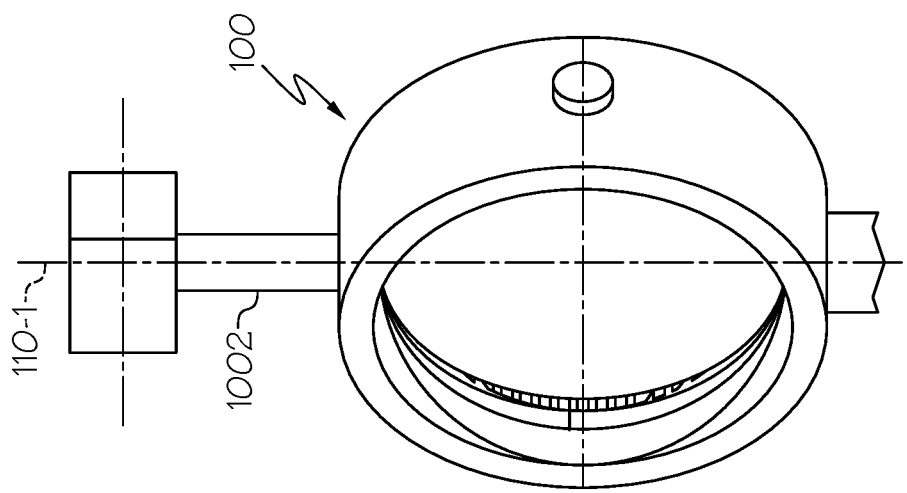

For completeness, FIG. 4 depicts a two-dimensional winding diagram showing how the two longitudinal phase coils 402-1, 402-2 are wound in 24 longitudinal slots 204, and FIG. 5 depicts a two-dimensional winding diagram showing how the two latitudinal phase coils 502-1, 502-2 are wound in 16 longitudinal slots 206. As FIG. 4 depicts, the two longitudinal phase coils 402-1, 402-2 are distributed evenly in the longitudinal slots 204 and are displaced from each other by 90 electrical degrees $$(\text{e.g.}, \frac{\pi}{2}).$$

Similarly, FIG. 5 depicts that the two latitudinal phase coils 502-1, 502-2 are distributed evenly in the latitudinal slots 206 and are displaced from each other by 90 electrical degrees $$(\text{e.g.}, \frac{\pi}{2}).$$

This winding configuration produces near sinusoidal flux density when electrical current is supplied to one or more of the plurality of longitudinal coils 402-1, 402-2 or to one or more of the plurality of latitudinal coils 502-1, 502-2.

Returning now to FIG. 1, it is noted that the first and second hemispherical shell rotors 104, 106 are both mounted for rotation relative to the spherical stator body 102. The first and second hemispherical shell rotors 104, 106 are each spaced apart from, and surrounds a portion of, the spherical stator body 102. More specifically, the first hemispherical shell rotor 104 surrounds a portion of a first half of the spherical stator body 102, and the second hemispherical shell rotor 106 surrounds a portion of a second half of the spherical stator body 102. As FIG. 1 also depicts, the first and second hemispherical shell rotors 104, 106 are spaced apart from each other to define a gap 122.

A plurality of magnets are coupled to inner surfaces of the first and second hemispherical shell rotors 104, 106. In particular, as FIGS. 6A, 6B, 8A, and 8B depict, a first plurality of magnets 602 are coupled to an inner surface 604 of the first hemispherical shell rotor 104, and as FIGS. 7A, 7B, 8A, and 8B depict, a second plurality of magnets 702 are coupled to an inner surface 704 of the second hemispherical shell rotor 106. As may be appreciated, when assembled as part of the machine 100, the first and second plurality of magnets 602, 702 face the spherical stator body 102. In the embodiment depicted in FIGS. 6A, 6B, 7A, 7B, 8A, and 8B, there are eight sets of magnets 602, 702 coupled to each of the inner surfaces 604, 704, and each magnet 602, 702 is implemented using a Neodymium permanent magnet. It will be appreciated, however, that the number and type of each of the first and second plurality of magnets 602, 702 may vary. It should be noted that in FIGS. 6A, 6B, 7A, 7B, 8A, and 8B, cross-hatching represents magnetic north (N) poles and stippling represents magnetic south (S) poles.

Indeed, in another embodiment, which is depicted in FIGS. 9A and 9B, the magnets 602, 702 are arranged in the form of a Halbach array, using sixteen Neodymium permanent magnets. It should be noted that the arrows used in FIGS. 9A and 9B indicate the direction of magnetization, and the dotted lines and associated arrows indicate one example of the magnetic flux direction in the first and second hemispherical shell rotors 104, 106. The use of a Halbach array arrangement produces a near sinusoidal concentrated rotor flux density distribution. As a result, the first and second hemispherical shell rotors 104, 106 and/or the gimbal 114 need not be formed of a ferromagnetic material, since the magnetic flux concentrates on the side facing the spherical stator body 102. As with the embodiment depicted in FIGS. 6A, 6B, 7A, 7B, 8A, and 8B, it will be appreciated that in this embodiment the number and type of each of the first and second plurality of magnets 602, 702 may vary.

With the herein described configuration, when electrical current is supplied to one or more of the longitudinal coils 402 or to one or more of the latitudinal coils 502, a Lorentz force is generated that causes movement of the first and second hemispherical shell rotors 104, 106. The movement of the first and second hemispherical shell rotors 104, 106 may be 360-degrees of unconstrained rotation around one or both of the first and second rotational axes.

In some embodiments, the electromagnetic machine 100 may be energized to rotate about only one of the rotational axes 110-1. In such embodiments, as FIGS. 10A-10E depict, the electromagnetic machine 100 may include a load shaft 1002 that is coupled to, and is rotatable with, the gimbal 114 about the first rotational axis 110-1. This configuration may be implemented when only rotation about the first rotational axis 110-1 is needed or desired. To do so, at least in the embodiment described above and depicted in FIGS. 1-5, the longitudinal phase coils 402-1, 402-2 are selectively energized to impart rotation about the first rotational axis 110-1.

Figure 11A:
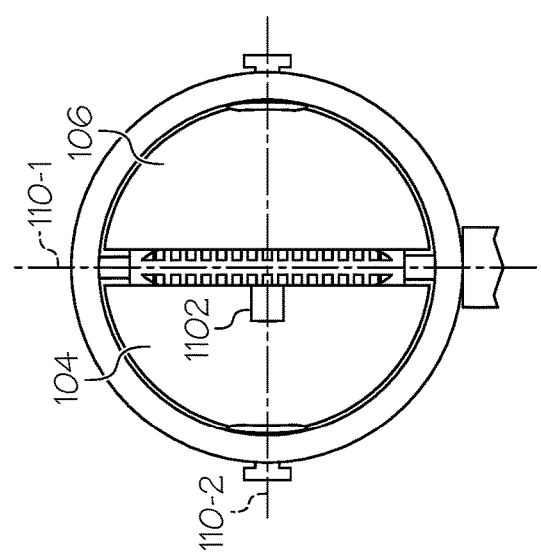
FIGS. 11A-11J depict rotation of portions of the electromagnetic machine about two perpendicular rotational axes.
Figure 11B:
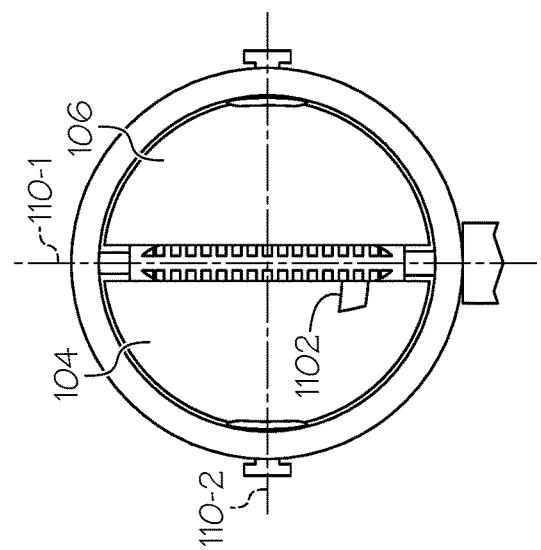
Figure 11C:
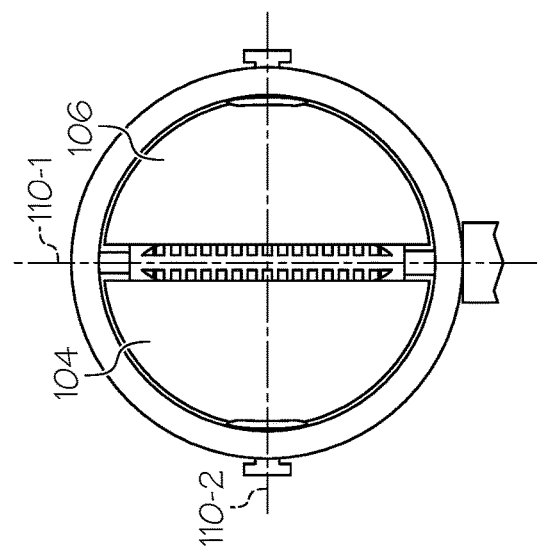
Figure 11D:
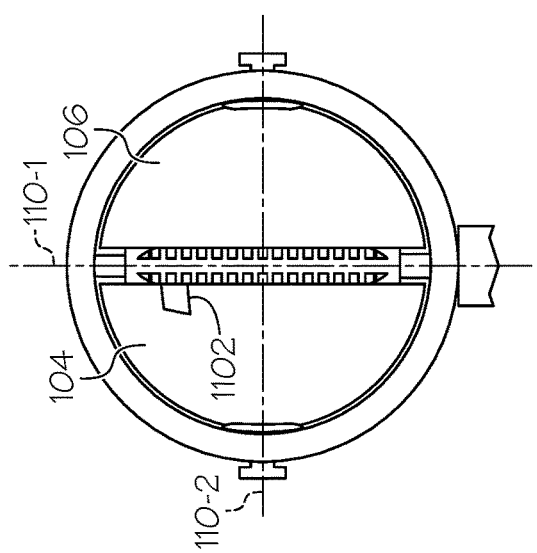
Figure 11E:
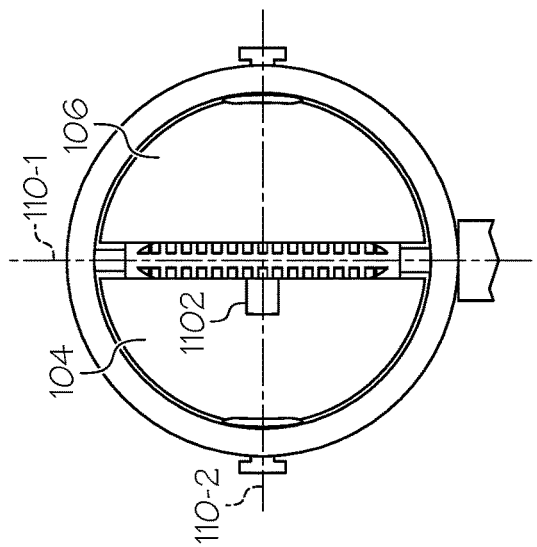
Figure 11H:
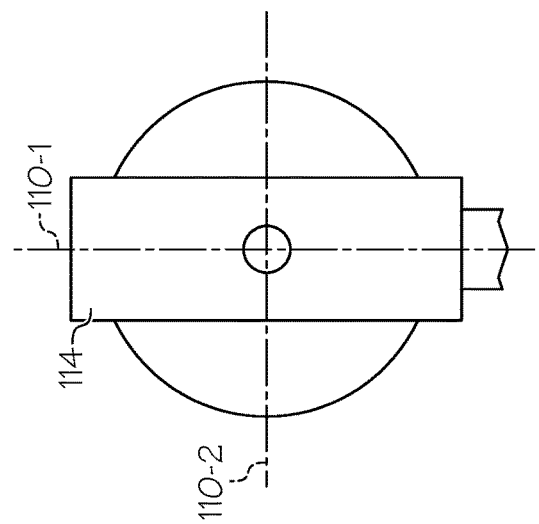
Figure 11G:
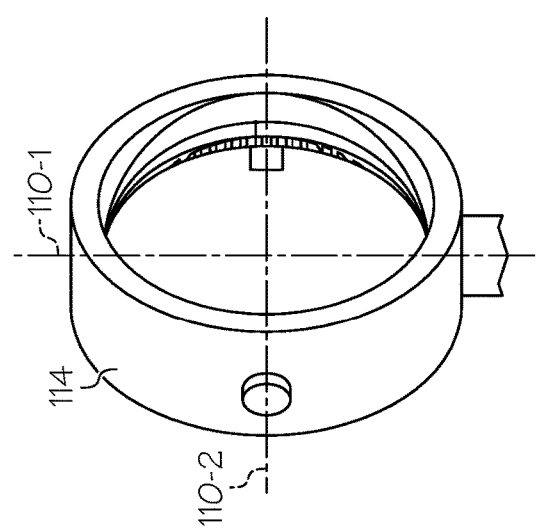
Figure 11F:
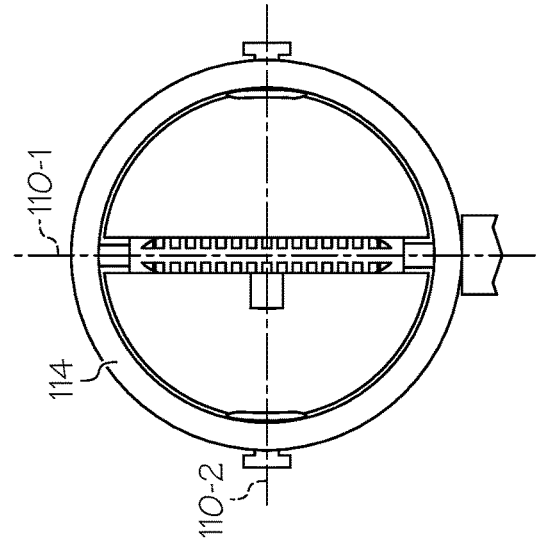
Figure 11J:
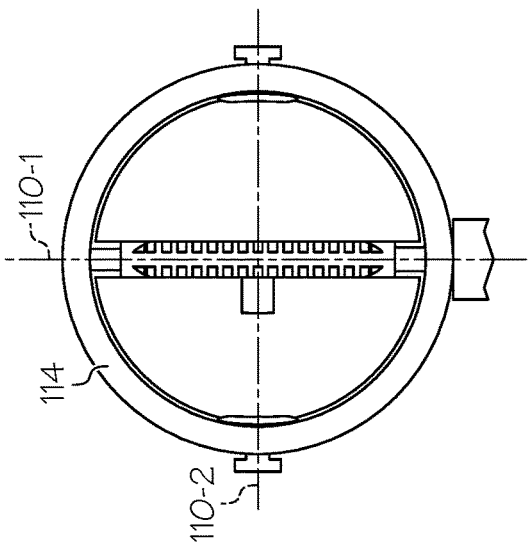
Figure 11I:
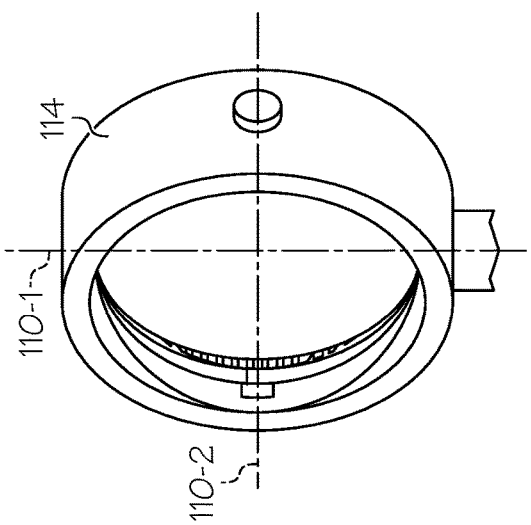

In yet other embodiments, the electromagnetic machine 100 may be energized to rotate about one or both rotational axes 110, either separately or simultaneously. In such embodiments, as FIG. 11A depicts, a load 1102, such as a camera, may be coupled to (or otherwise mounted on) one or both of the first and second hemispherical shell rotors 104, 106. In the depicted embodiment, the load 1102 is coupled to only the first hemispherical shell rotor 104. Regardless of whether the load 1102 is coupled to (or otherwise mounted on) one or both of the hemispherical shell rotors 104, 106, as FIGS. 11A-11J depict, the first and second hemispherical shell rotors 104, 106, and thus the gimbal 114, are rotatable, relative to the spherical stator body 102, about the first rotational axis 110-1, and are also rotatable, relative to the gimbal 114 and the spherical stator body 102, about the second rotational axis 110-2. To implement this functionality, at least in the embodiment described above and depicted in FIGS. 1-5, the longitudinal phase coils 402-1, 402-2 are selectively energized to impart rotation about the first rotational axis 110-1, and the latitudinal phase coils 502-1, 502-2 are selectively energized to impart rotation about the second rotational axis 110-2.

It will be appreciated that to impart a desired rotational frequency of the machine 100 about one or both of the rotational axes 110, the frequency of the electrical current that is supplied to the longitudinal coils 402 and/or to the latitudinal coils 502 should be twice the desired rotational frequency. For example, if the desired rotational frequency about the first rotational axis is 1800 rpm (revolutions-per-minute), then the electrical current supplied to the longitudinal phase coils 402-1, 402-2 should be supplied at a frequency of 60 Hz.

The spherical electromagnetic machine 100 disclose herein can deliver relatively higher torque with reduced torque ripple for many industrial applications and/or allows for relatively less difficulty in winding the coils thereon. It is capable of producing 360 degree angular movement in both rotational axes 110-1 and 110-2. In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A spherical electromagnetic machine, comprising:
a spherical stator body having an outer surface;
a plurality of longitudinal slots formed in, and spaced evenly around, the outer surface;
a plurality of latitudinal slots formed in, and spaced evenly around, the outer surface;
a plurality of longitudinal coils wound around the spherical stator body, each longitudinal coil having a portion thereof disposed within a different one of the longitudinal slots;
a plurality of latitudinal coils wound around the spherical stator body, each latitudinal coil having a portion thereof disposed within a different one of the latitudinal slots;
a first hemispherical shell rotor mounted for rotation relative to the spherical stator body and spaced apart therefrom, the first hemispherical shell rotor surrounding a portion of a first half of the spherical stator body;
a first plurality of magnets coupled to an inner surface of the first hemispherical shell rotor and facing the spherical stator body;
a second hemispherical shell rotor mounted for rotation relative to the spherical stator body and spaced apart therefrom, the second hemispherical shell rotor surrounding a portion of a second half of the spherical stator body; and
a second plurality of magnets coupled to an inner surface of the second hemispherical shell rotor and facing the spherical stator body,
wherein a Lorentz force causes movement of the first and second hemispherical shell rotors when electrical current is supplied to one or more of the plurality of longitudinal coils or to one or more of the plurality of latitudinal coils.

2. The spherical electromagnetic machine of claim 1, further comprising:
a gimbal coupled to the stator base holder, the first hemispherical shell rotor, and the second hemispherical shell rotor.

3. The spherical electromagnetic machine of claim 2, wherein the first and second hemispherical shell rotors and the gimbal, by virtue of its coupling to the first and second hemispherical shell rotors, are rotatable, relative to the spherical stator body, about a first rotational axis.

4. The spherical electromagnetic machine of claim 3, further comprising:
a load shaft coupled to the gimbal and rotatable therewith about the first rotational axis.

5. The spherical electromagnetic machine of claim 2, wherein:
the first and second hemispherical shell rotors are each rotatable, relative to the gimbal, about a second rotational axis; and
the second rotational axis is perpendicular to the first rotational axis.

6. The spherical electromagnetic machine of claim 2, wherein the movement of the first and second hemispherical shell rotors is 360-degrees of unconstrained rotation around one or both of the first and second rotational axes.

7. The spherical electromagnetic machine of claim 6, further comprising: a load coupled to one or both of the hemispherical shell rotors and rotatable therewith about one or both of the first and second rotational axes.

8. The spherical electromagnetic machine of claim 1, wherein the spherical stator body comprises a ferromagnetic material.

9. The spherical electromagnetic machine of claim 1, wherein:
the spherical stator body includes a predetermined number of longitudinal slots ($N_{longitude}$) and a predetermined number of latitudinal slots ($N_{latitude}$);
the spherical stator body, the plurality of longitudinal coils, and the plurality of latitudinal coils implement a stator having a predetermined number of poles (P);
the longitudinal slots are separated from each other by a longitudinal slot pitch angle defined, in radians, as $$\frac{\pi * P}{2 * N_{longitude}};$$

and
the latitudinal slots are separated from each other by a latitudinal slot pitch angle defined, in radians, as $$\frac{\pi * P}{2 * N_{latitude}}.$$

10. The spherical electromagnetic machine of claim 9, wherein:
the plurality of longitudinal coils includes a predetermined number of different longitudinal phase coils ($N_{long\_phase}$); and
the plurality of latitudinal coils includes a predetermined number of different latitudinal phase coils ($N_{lat\_phase}$).

11. The spherical electromagnetic machine of claim 9, wherein:
the movement of the first and second hemispherical shell rotors is 360-degrees of unconstrained rotation, at a desired rotational frequency, around one or both of two perpendicular axes; and
the electrical current supplied to the one or more longitudinal coils or to the one or more latitudinal coils is supplied at an electrical frequency that is $$\frac{P}{2}$$

times the desired rotational frequency.

12. A spherical electromagnetic machine, comprising:
a spherical stator body having an outer surface;
a predetermined number of longitudinal slots ($N_{longitude}$) formed in, and spaced evenly around, the outer surface;
a predetermined number of latitudinal slots ($N_{latitude}$) formed in, and spaced evenly around, the outer surface;
a plurality of longitudinal coils wound around the spherical stator body, each longitudinal coil having a portion thereof disposed within a different one of the longitudinal slots;
a plurality of latitudinal coils wound around the spherical stator body, each latitudinal coil having a portion thereof disposed within a different one of the latitudinal slots;

a first hemispherical shell rotor mounted for rotation relative to the spherical stator body and spaced apart therefrom, the first hemispherical shell rotor surrounding a portion of a first half of the spherical stator body;

a first plurality of magnets coupled to an inner surface of the first hemispherical shell rotor and facing the spherical stator body;

a second hemispherical shell rotor mounted for rotation relative to the spherical stator body and spaced apart therefrom, the second hemispherical shell rotor surrounding a portion of a second half of the spherical stator body;

a second plurality of magnets coupled to an inner surface of the second hemispherical shell rotor and facing the spherical stator body; and a gimbal coupled to the spherical body, the first hemispherical shell rotor, and the second hemispherical shell rotor, wherein:
the spherical stator body, the plurality of longitudinal coils, and the plurality of latitudinal coils implement a stator having a predetermined number of poles (P),
the longitudinal slots are separated from each other by a longitudinal slot pitch angle in radians defined, in radians, as $$\frac{\pi * P}{2 * N_{longitude}};$$

and
the latitudinal slots are separated from each other by a latitudinal slot pitch angle in radians defined, in radians, as $$\frac{\pi * P}{2 * N_{latitude}}.$$

13. The spherical electromagnetic machine of claim 12, wherein a Lorentz force causes movement of the first and second hemispherical shell rotors when electrical current is supplied to one or more of the plurality of longitudinal coils or to one or more of the plurality of latitudinal coils.

14. The spherical electromagnetic machine of claim 12, wherein the first and second hemispherical shell rotors and the gimbal, by virtue of its coupling to the first and second hemispherical shell rotors, are rotatable, relative to the spherical stator body, about a first rotational axis.

15. The spherical electromagnetic machine of claim 14, further comprising:
a load shaft coupled to the gimbal and rotatable therewith about the first rotational axis.

16. The spherical electromagnetic machine of claim 12, wherein:
the first and second hemispherical shell rotors are each rotatable, relative to the gimbal, about a second rotational axis; and
the second rotational axis is perpendicular to the first rotational axis.

17. The spherical electromagnetic machine of claim 14, further comprising:
a load coupled to one or both of the hemispherical shell rotors and rotatable therewith about one or both of the first and second rotational axes.

18. The spherical electromagnetic machine of claim 12, wherein:
the movement of the first and second hemispherical shell rotors is 360-degrees of unconstrained rotation, at a desired rotational frequency, around one or both of two perpendicular axes; and
the electrical current supplied to the one or more longitudinal coils or to the one or more latitudinal coils is supplied at an electrical frequency that is $$\frac{P}{2}$$

times the desired rotational frequency.

19. The spherical electromagnetic machine of claim 12, wherein:
the plurality of longitudinal coils includes a predetermined number of different longitudinal phase coils ($N_{long\_phase}$); and
the plurality of latitudinal coils includes a predetermined number of different latitudinal phase coils ($N_{lat\_phase}$).

20. A spherical electromagnetic machine, comprising:
a spherical stator body having an outer surface;
twenty-four longitudinal slots formed in, and spaced evenly around, the outer surface;
sixteen latitudinal slots formed in, and spaced evenly around, the outer surface;
a plurality of longitudinal coils wound around the spherical stator body, each longitudinal coil having a portion thereof disposed within a different one of the longitudinal slots;
a plurality of latitudinal coils wound around the spherical stator body, each latitudinal coil having a portion thereof disposed within a different one of the latitudinal slots;
a first hemispherical shell rotor mounted for rotation relative to the spherical stator body and spaced apart therefrom, the first hemispherical shell rotor surrounding a portion of a first half of the spherical stator body;
a first plurality of magnets coupled to an inner surface of the first hemispherical shell rotor and facing the spherical stator body;
a second hemispherical shell rotor mounted for rotation relative to the spherical stator body and spaced apart therefrom, the second hemispherical shell rotor surrounding a portion of a second half of the spherical stator body;
a second plurality of magnets coupled to an inner surface of the second hemispherical shell rotor and facing the spherical stator body; and
a gimbal rotationally supporting the spherical stator body, the first hemispherical shell rotor, and the second hemispherical shell rotor, wherein:
the spherical stator body, the plurality of longitudinal coils, and the plurality of latitudinal coils implement a 4-pole stator,
the longitudinal slots are separated from each other by a longitudinal slot pitch angle of 15-degrees $$\left(\frac{\pi}{12} \text{ rad}\right),$$

the latitudinal slots are separated from each other by a latitudinal slot pitch angle of 22.5-degree $$\left(\frac{\pi}{8} \text{ rad}\right),$$

and
a Lorentz force causes movement of the first and second hemispherical shell rotors when electrical current is supplied to one or more of the longitudinal coils or to one or more of the plurality of latitudinal coils.

* * * * *